United States Patent
Zatorski et al.

(10) Patent No.: US 6,929,445 B2
(45) Date of Patent: Aug. 16, 2005

(54) SPLIT FLOW TURBINE NOZZLE

(75) Inventors: Darek Tomasz Zatorski, Florence, KY (US); Humphrey Martin Wills, Oadby (GB)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/690,915

(22) Filed: Oct. 22, 2003

(65) Prior Publication Data
US 2005/0089393 A1 Apr. 28, 2005

(51) Int. Cl.[7] .................................... F01D 5/14
(52) U.S. Cl. .................. 415/115; 415/191; 416/97 R
(58) Field of Search ................ 415/115, 191; 416/97 R

(56) References Cited

U.S. PATENT DOCUMENTS

| | | | |
|---|---|---|---|
| 3,045,965 A | 7/1962 | Bowmer | |
| 3,475,107 A | 10/1969 | Auxier | |
| 3,807,892 A | 4/1974 | Frei et al. | |
| 4,187,054 A | 2/1980 | Landis et al. | |
| 5,207,556 A | 5/1993 | Frederick et al. | |
| 5,358,374 A | 10/1994 | Correia et al. | |
| 5,399,065 A * | 3/1995 | Kudo et al. | 415/115 |
| 5,741,117 A | 4/1998 | Clevenger et al. | |
| 6,036,436 A * | 3/2000 | Fukuno et al. | 416/97 R |
| 6,200,087 B1 | 3/2001 | Tung et al. | |
| 6,264,426 B1 * | 7/2001 | Fukuno et al. | 415/115 |
| 6,270,317 B1 | 8/2001 | Manning et al. | |

FOREIGN PATENT DOCUMENTS

| | | |
|---|---|---|
| EP | 0542403 A1 | 5/1993 |
| EP | 0768448 A1 | 4/1997 |
| EP | 0864728 A2 | 9/1998 |
| EP | 0930419 A1 | 7/1999 |
| EP | 1136652 A1 | 9/2001 |
| EP | 1489265 A2 | 12/2004 |
| WO | 9936675 A1 | 7/1999 |

OTHER PUBLICATIONS

GE Aircraft Engines, low pressure turbine nozzle, on sale more than one year before Sep. 1, 2003.

* cited by examiner

Primary Examiner—Edward K. Look
Assistant Examiner—Igor Kershteyn
(74) Attorney, Agent, or Firm—William S. Andes; Francis L. Conte

(57) ABSTRACT

A turbine nozzle includes a hollow vane having opposite pressure and suction sides extending in span between outer and inner bands. The vane includes a forward flow channel behind the leading edge, an aft flow channel in front of the trailing edge, and a middle flow channel disposed therebetween. The three flow channels are disposed in flow communication with an outer plenum outside the outer band for receiving cooling air therefrom. The forward and middle channels are also disposed in flow communication with an inner plenum below the inner band for discharging the air. The aft channel discharges air through the inner band outside the inner plenum in split flow at different pressures.

21 Claims, 4 Drawing Sheets

SPLIT FLOW TURBINE NOZZLE

BACKGROUND OF THE INVENTION

The present invention relates generally to gas turbine engines, and, more specifically, to turbine nozzles therein.

In a gas turbine engine air is pressurized in a compressor and mixed with fuel for generating hot combustion gases in a combustor. The hot gases are discharged from the combustor into a high pressure turbine which extracts energy therefrom for powering the compressor.

A low pressure turbine follows the high pressure turbine for extracting additional energy from the combustion gases for producing useful work. In a typical turbofan aircraft engine application, the low pressure turbine powers a fan disposed upstream from the compressor for producing propulsion thrust to power an aircraft. In marine and industrial applications, the low pressure turbine is joined to an output drive shaft for powering an electrical generator or propulsion screws in a ship.

The high pressure turbine may have one or more stages of stationary nozzle vanes and rotary blades, with the low pressure turbine typically including several stages of nozzles and blades. The turbine blades typically increase in size in the downstream direction as the combustion gases expand, and the temperature of the gases decreases as energy is extracted.

In view of the high temperature of the combustion gases, engine components subjected thereto typically require cooling for enhancing the life thereof. Accordingly, a portion of the air pressurized in the compressor may be channeled to various engine components for providing cooling thereof in various manners. The prior art is replete with various configurations for cooling combustor liners, nozzle vanes, rotor blades, and their associated components.

However, the air diverted for cooling the engine components is not used in the combustion process and therefore decreases engine efficiency. The known cooling configurations therefore attempt to maximize the cooling effectiveness of the diverted compressor air, which is typically used multiple times prior to being reintroduced into the exhaust path. Correspondingly, state-of-the-art superalloy materials are typically used in the turbine components for their enhanced strength at high temperature and long life. Oxidation resistance thereof is further enhanced by suitable coatings such as platinum-aluminide which further increase the durability and life of the components.

Since the combustion gases are hottest inside the combustor, the first stage high pressure turbine nozzle disposed at the outlet of the combustor requires maximum cooling effectiveness for long life. The first stage nozzle typically uses the highest pressure compressor discharge air for cooling thereof, with elaborate cooling configurations of the nozzle vanes themselves. The vanes typically have multiple internal passages for circulating the air coolant, and internal impingement baffles are typically used for impingement cooling the internal surfaces of the vanes.

The vanes typically include several rows of film cooling holes extending through the pressure and suction sides thereof which discharge the spent impingement air into corresponding films of cooling air over the external surfaces of the vane airfoil.

The pressure side of the vane airfoil is generally concave and the opposite suction side of the airfoil is generally convex, with a generally crescent shape between the leading and trailing edges of the airfoil for efficiently directing the combustion gases to the first stage high pressure turbine rotor blades. Both the temperature distribution and pressure distribution of the combustion gases over the nozzle vanes varies from the leading to trailing edges thereof, and the cooling configuration must be specifically adapted for providing balanced cooling of the nozzle vane while maintaining acceptable backflow margin. The internal pressure of the coolant in the vanes must be locally higher than the external pressure of the combustion gases to prevent backflow of the combustion gases into the film cooling holes.

The first stage rotor blades extend radially outwardly from the perimeter of a rotor disk and require correspondingly sophisticated cooling configurations different than those used for the stationary turbine nozzle. Compressor discharge air is typically used for cooling the first stage turbine blades, without discrete impingement baffles therein in view of the substantial centrifugal forces generated in the rotating blade during operation.

In a two stage high pressure turbine, a second stage turbine nozzle and second stage rotor blades are employed and typically require corresponding cooling thereof in configurations different than those for the first stage nozzle and blades in view of the different pressure and temperature distribution thereover.

The multistage low pressure turbine includes additional rows of nozzles and rotor blades which may require cooling or not depending upon the particular engine configuration. Since the combustion gas temperature is substantially reduced in the low pressure turbine, the additional complexity and need for internal cooling of the nozzle vanes and blades is typically not required.

A particular problem in cooling the low pressure turbine nozzle is the decreasing pressure distribution of the combustion gases flowing therethrough. Whereas compressor discharge air may be used for cooling the first stage turbine nozzle while maintaining acceptable backflow margins at the various rows of film cooling holes between the leading and trailing edges of the vanes, the high pressure compressor discharge air can provide excessive backflow margins when used in the low pressure turbine nozzle in view of the substantial reduction in pressure of the combustion gases.

Accordingly, one embodiment of a low pressure turbine nozzle used publicly for many years in this country bifurcates the cooling channels of the nozzle vane in two portions corresponding with the leading edge and trailing edge regions of the vane. The leading edge cooling circuit is joined in flow communication with an eight intermediate stage of the compressor, whereas the trailing edge circuit of the vane is joined in flow communication with cooling air recouped from the high pressure turbine. The recoup air has a different temperature and different pressure than the intermediate stage compressor air, and the vanes are imperforate without any outlet holes in the pressure and suction sides thereof.

In this conventional embodiment, the low pressure turbine nozzle vanes may be otherwise imperforate, with the two sources of cooling air being discharged through the inner band thereof for providing purge cooling of various forward and aft cavities found therebelow.

Marine and industrial gas turbine engines are typically derived from aircraft turbofan engines in view of the substantial sophistication and development cost thereof. The core engine including the compressor, combustor, and high pressure turbine of the turbofan engine may be used with little or no changes in the derivative marine or industrial engine. The low pressure turbine may be suitably modified with an output drive shaft for powering an electrical generator or the propulsion mechanism for a ship. However, the cooling configuration for the turbine nozzles and blades may remain unchanged in the derivative engine.

In the continuing development of derivative engines, the fan of the parent turbofan engine may be replaced by a multistage low pressure compressor driven by a new intermediate power turbine located between the high pressure turbine and the low pressure turbine. The intermediate power turbine in one configuration may use two stages of nozzles and blades.

Since the intermediate stages are located between the high pressure turbine and the low pressure turbine they are subject to the transition in pressure and temperature distribution therebetween. Since the first stage of the intermediate power turbine is disposed immediately downstream of the high pressure turbine it requires suitable cooling for the intended life.

However, the second stage nozzle of the intermediate power turbine is located downstream therefrom and immediately upstream of the low pressure turbine and does not require internal cooling of the vanes, which may therefore be simply made solid.

The first stage intermediate nozzle may be formed of a suitable superalloy, such as the same nickel-based superalloy used for the high pressure turbine nozzles, with a corresponding oxidation resistant coating such as platinum-aluminide. These high strength nozzle vanes have an associated maximum allowable metal temperature which is slightly below the temperature of the combustion gases in the intermediate power turbine.

Accordingly, the first stage nozzle of the intermediate power turbine requires additional cooling for achieving the desired life thereof, but that cooling must be effected in a new configuration being simpler and less expensive than those employed for the high pressure turbine. And, minimal additional air should be diverted from the compressor for nozzle cooling, while maintaining acceptable backflow margins.

It is therefore desired to provide a new turbine nozzle specifically configured for the operating environment of an intermediate power turbine between high and low pressure turbines.

BRIEF DESCRIPTION OF THE INVENTION

A turbine nozzle includes a hollow vane having opposite pressure and suction sides extending in span between outer and inner bands. The vane includes a forward flow channel behind the leading edge, an aft flow channel in front of the trailing edge, and a middle flow channel disposed therebetween. The three flow channels are disposed in flow communication with an outer plenum outside the outer band for receiving cooling air therefrom. The forward and middle channels are also disposed in flow communication with an inner plenum below the inner band for discharging the air. The aft channel discharges air through the inner band outside the inner plenum in split flow at different pressures.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
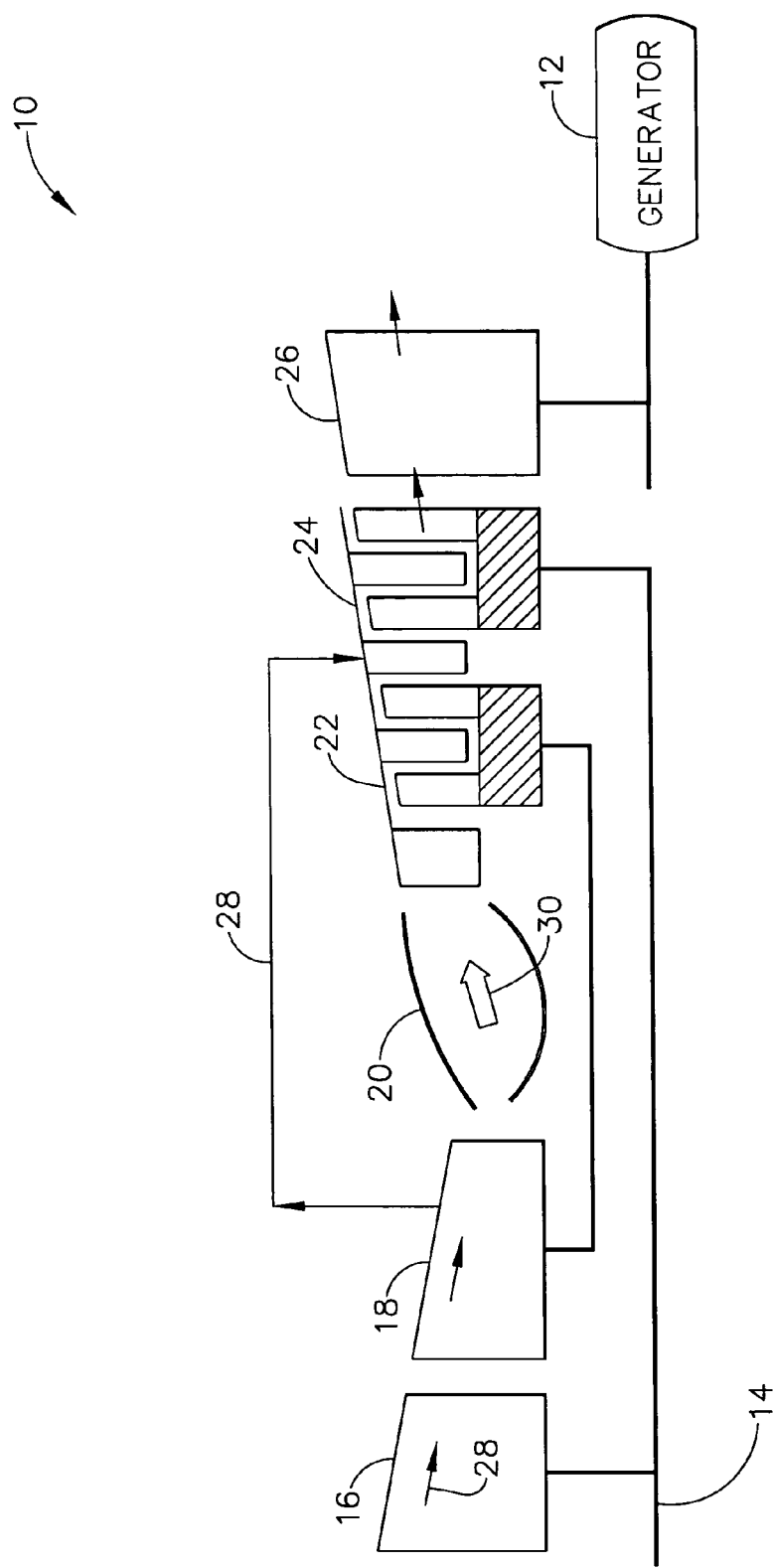
FIG. 1 is schematic view of an industrial gas turbine engine including an intermediate power turbine therein.

Illustrated schematically in FIG. 1 is an industrial gas turbine engine 10 configured in an exemplary embodiment for powering an external electrical generator 12. The engine is axisymmetrical about a longitudinal or axial centerline axis 14, and includes three rotors.

More specifically, the engine includes in serial flow communication a low pressure compressor 16, a high pressure compressor 18, a combustor 20, a high pressure turbine (HPT) 22, an intermediate power turbine (IPT) 24, and a low pressure turbine (LPT) 26 joined to corresponding rotors or drive shafts. The low and high pressure compressors 16,18 are conventional multistage compressors which pressurize air 28 in turn axially therealong. The pressurized air is discharged from the last stage of the high pressure compressor and mixed with fuel in the combustor 20 for generating hot combustion gases 30.

The high pressure turbine 22 is conventional and includes two nozzle and rotor stages through which the hot combustion gases are channeled for powering the high pressure compressor 18 through a corresponding drive shaft therebetween.

The intermediate power turbine 24 also include two nozzle and rotor stages in this exemplary embodiment and extracts additional energy from the combustion gases discharged from the high pressure turbine for powering the low pressure compressor 16 through a corresponding drive shaft.

The low pressure turbine 26 is a conventional multistage turbine which extracts additional energy from the combustion gases discharged from the intermediate power turbine 24 for powering the generator 12 through a corresponding output drive shaft.

As the combustion gases 30 flow downstream through the sequential nozzles and rotor blades of the three turbines 22,24,26 their pressure and temperature decrease as energy is extracted therefrom. Accordingly, the various nozzle vanes and rotor blades of the turbines are specifically configured for the pressure and temperature distribution of the combustion gases which vary therealong. In particular, the vanes and blades of the high pressure turbine and the intermediate power turbine require suitable cooling for the specific temperature of the combustion gases 30 thereat using a portion of the pressurized air 28 diverted from the combustion process inside the annular combustor 20.

Figure 2:
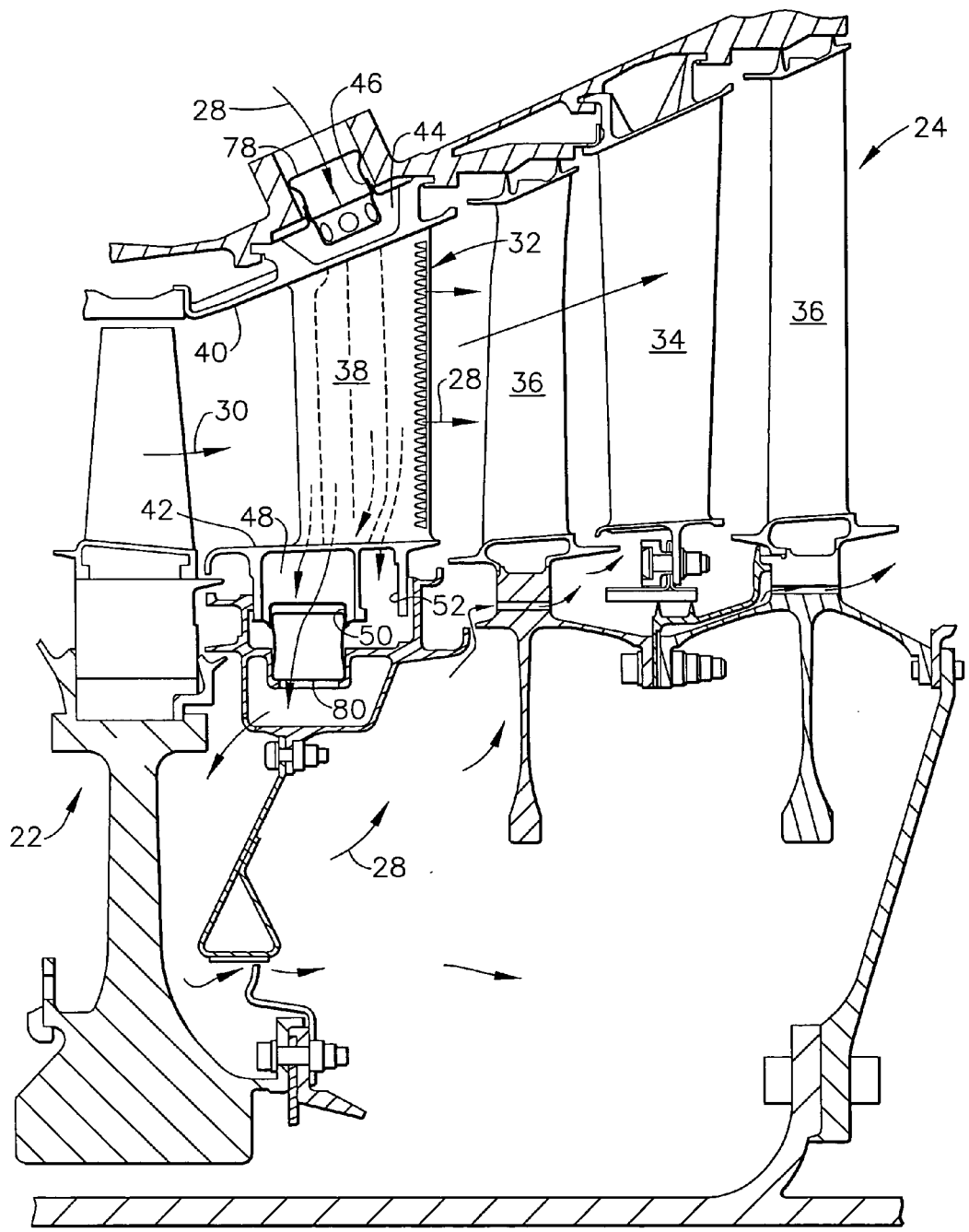
FIG. 2 is an axial sectional view of the intermediate power turbine in FIG. 1 following a second stage high pressure turbine.

FIG. 2 illustrates in more particularity an exemplary embodiment of the intermediate power turbine 24 located directly following the last rotor stage of the high pressure turbine 22, and upstream of the low pressure turbine, not illustrated in FIG. 2. Since the combustion gases 30 are discharged from the combustor at high temperature, both the nozzle vanes and rotor blades of the high pressure turbine 22 are suitably cooled using conventional cooling configurations in which the highest pressure compressor discharge air is channeled therethrough. However, the combustion gases 30 entering the intermediate power turbine 24 have reduced temperature and pressure which substantially decreases the need for cooling the associated turbine components in this region of the engine.

In particular, the intermediate power turbine 24 includes a first stage turbine nozzle 32 which is specifically configured for being cooled against the reduced heat of the combustion gases 30 at this location. The intermediate power turbine also includes a second stage turbine nozzle 34 which may have uncooled, solid nozzle vanes, with the two turbine nozzles cooperating with corresponding rows of turbine rotor blades 36 which may also be solid and uncooled in this exemplary configuration.

But for the first stage turbine nozzle 32, the intermediate power turbine 24 may have any conventional configuration and operation for suitably powering the low pressure compressor.

Figure 3:
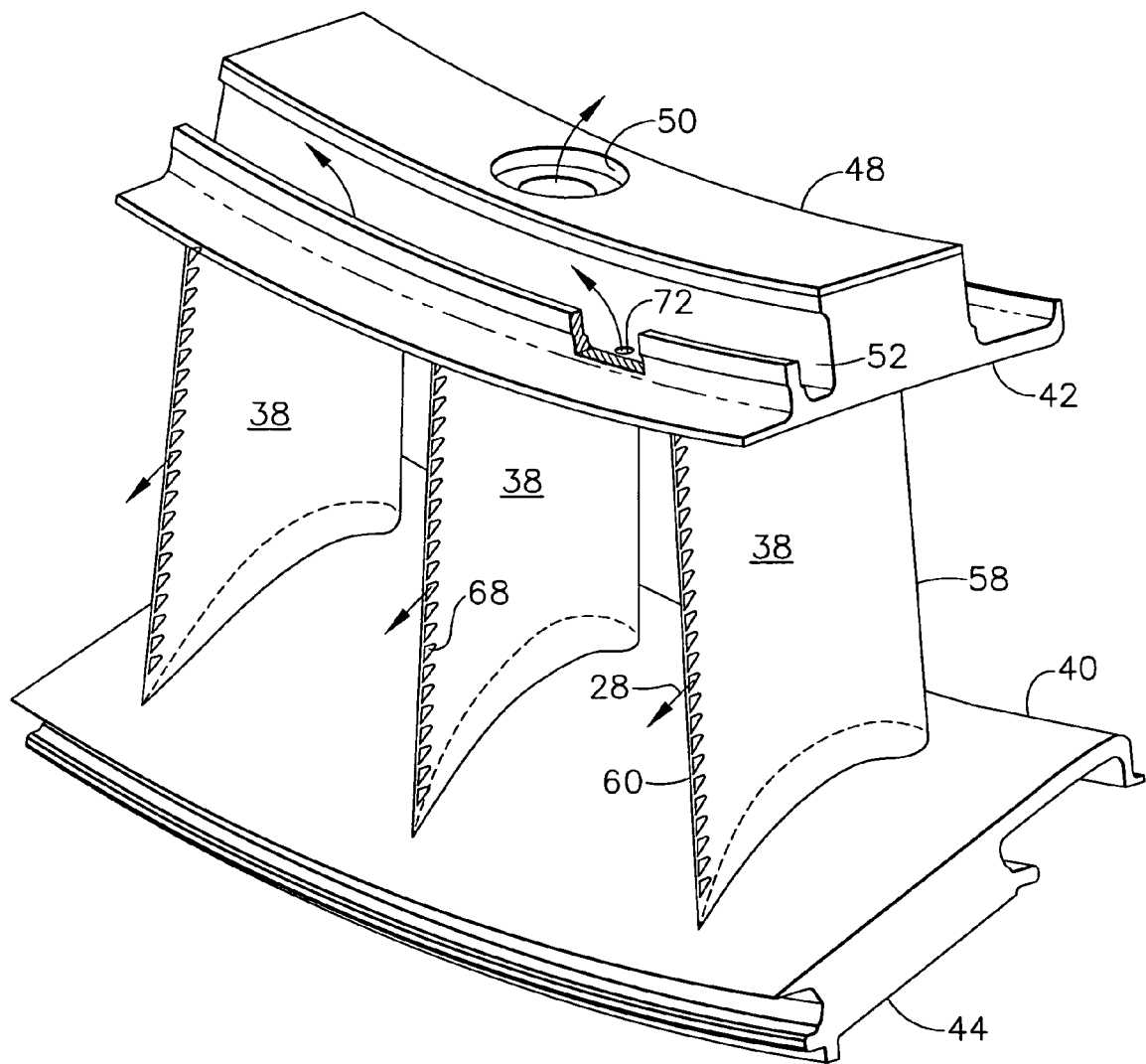
FIG. 3 is an isometric view of a portion of the first nozzle stage of the intermediate power turbine illustrated in FIG. 2.

As additionally shown in FIG. 3, the IPT 24 includes a plurality of hollow airfoils or vanes 38 arranged in a row and joined at opposite radial ends to radially outer and inner arcuate bands 40,42. In an exemplary configuration, three vanes 38 are integrally joined or cast with corresponding arcuate band segments 40,42, with multiple segments being joined end to end to complete the full ring complement of vanes in the turbine nozzle.

Figure 4:
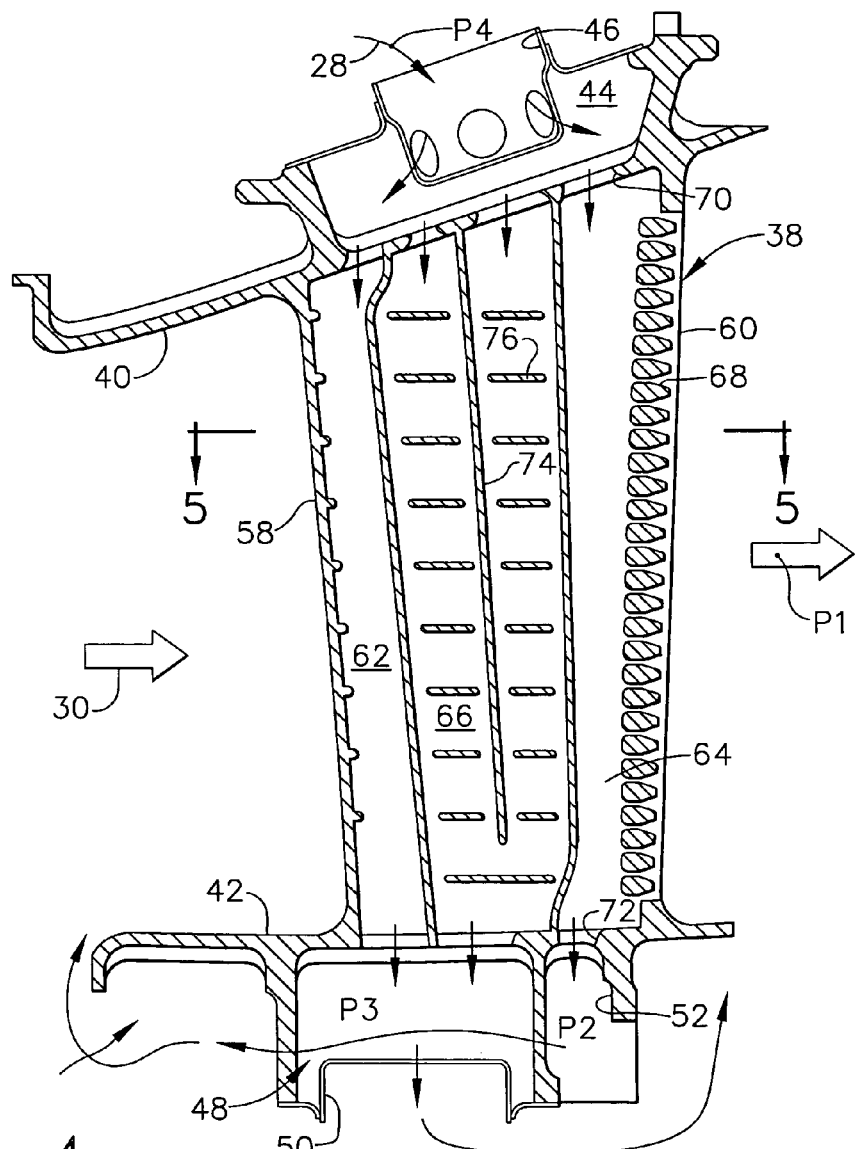
FIG. 4 is an axial sectional view through one of the nozzle vanes of the first stage intermediate power turbine illustrated in FIG. 2.

As illustrated in FIGS. 2 and 4 the outer band 40 includes a closed outer plenum 44 including an aperture or recess inlet 46 for receiving the compressed air 28 from the high pressure compressor 18. The outer plenum 44 may be conveniently defined between forward and aft hooks extending outwardly from the outer band for mounting the first stage nozzle in a surrounding casing in a conventional manner. The supporting hooks may be joined by a sheet metal cover for providing an enclosed cavity defining the outer plenum 44. And a suitable recess opening may be formed in the sheet metal cover to define the inlet 46.

Correspondingly, the inner band 42 includes an inner plenum 48 having an aperture or cavity defining an outlet 50. The inner plenum 48 may be defined between a pair of flanges extending radially inwardly from the inner band and bridged by a sheet metal cover in which the outlet 50 is formed.

The inner band 42 also includes an aft flange spaced aft from the flanges of the inner plenum 48 which defines therebetween an aft cavity or recess 52. The various flanges of the inner band 42 illustrated in FIG. 2 may be configured in any conventional manner for cooperating with annular baffles defining a corresponding forward cavity between the last stage HPT rotor and the first stage IPT nozzle, and an aft cavity between the first stage IPT nozzle and the downstream first stage IPT rotor.

Figure 5:
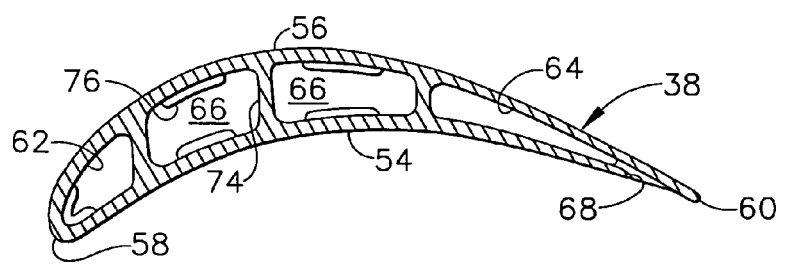
FIG. 5 is a radial sectional view through the nozzle vane illustrated in FIG. 4 and taken along line 5—5.

As shown in FIGS. 4 and 5, each of the vanes 38 includes circumferentially opposite pressure and suction sidewalls or sides 54,56 joined together at chordally or axially opposite leading and trailing edges 58,60. The pressure side 54 is generally concave and extends radially in span between the outer and inner bands. The suction side 56 is generally convex and similarly extends between the two bands. Each vane has a generally crescent aerodynamic profile which effects corresponding pressure and temperature distributions of the combustion gases that flow thereover during operation.

Each vane 38 illustrated in FIGS. 4 and 5 further includes forward, aft, and middle flow circuits or channels 62,64,66 extending in radial span between the outer and inner bands.

The forward channel 62 is disposed directly behind the leading edge 58 in flow communication with the outer and inner plenums 44,48.

The middle channel 66 is disposed directly behind the forward channel 62 in flow communication with the outer and inner plenums. And, the aft channel 64 is disposed directly behind the middle channel 66 and directly in front of the trailing edge 60 in flow communication with the outer plenum 44, and the aft recess 52 outside the inner plenum 48. The several channels 62,64,66 are defined by corresponding internal bridges which extend along the radial span of the vane and transversely between the opposite pressure and suction sides.

A particular advantage of the multichannel cooling circuit configuration illustrated in FIG. 4 is the ability to use a single-pressure source air 28 which is preferentially split inside the vane for providing balanced cooling of the different regions thereof, with corresponding backflow margin notwithstanding variation in distribution of temperature and pressure of the combustion gases 30 flowing downstream over the external surfaces of the vanes.

As indicated above, the pressure and temperature distribution of the combustion gases discharged from the high pressure turbine creates special problems typically requiring two different pressure sources of air for the turbine nozzle in this region. One conventional low pressure turbine nozzle utilizes eighth stage air from the compressor and recoup air from the high pressure turbine suitably channeled to the leading and trailing edge regions of the nozzle vanes.

However, the multichannel configuration of the nozzle vanes 38 illustrated in FIG. 4 permit the use of a single pressure source of compressed air 28 for the entire nozzle vane, suitably split for obtaining different discharge pressures thereof for matching the operating environment in this region of the engine. For example, eleventh stage pressurized air 28 may be bled from the high pressure compressor 18 illustrated in FIG. 1 and suitably channeled to the first stage turbine nozzle 32 of the IPT 24.

One feature in splitting the single source inlet air 28 is the introduction of a radial row of trailing edge outlet slots 68 extending through the pressure side of each vane adjacent the trailing edge thereof in flow communication with the aft channel 64. As the air is discharged through the row of trailing edge outlets 68, its pressure decreases so that the discharge pressure in the aft inner recess 52 illustrated in FIG. 4 is substantially lower than the air inlet pressure to the nozzle.

Correspondingly, the pressure and suction sides 54,56 of each vane are preferably imperforate without holes therethrough along both the forward and middle channels 62,64 for confining the pressurized air between the outer and inner plenums with correspondingly less pressure loss therein. The pressure and suction sides along the aft channel 64 are also preferably imperforate except for the single row of trailing edge outlets 68. And, the several bridges defining the internal channels in the vanes are also preferably imperforate for separately confining the airflow in the corresponding channels inside the vanes.

The control of the pressurized air into the multiple channels inside each vane is controlled by corresponding aperture inlets 70 and aperture outlets 72 in the outer and inner bands 40,42. In particular, the outer band includes forward, aft, and middle aperture inlets 70 extending radially therethrough which join the outer plenum 44 in flow communication with the forward, aft, and middle channels 62,64,66, respectively. The inner band 42 includes forward, aft, and middle aperture outlets 72 joining in flow communication the forward and middle channels 62,66 with the inner plenum 48, and the aft channel 64 with the aft recess 52 outside the inner plenum.

As illustrated in FIG. 4, the forward channel 62 is sized for providing local cooling of the leading edge region of the vane over the entire radial span of the vane between the two bands. The aft channel 64 is suitably sized for providing local cooling of the trailing edge region of the vane over the vane span between the two bands. And, the middle channel 62 is correspondingly sized for locally cooling the middle or intermediate region of each vane over the vane span.

As indicated above, the pressure and temperature distribution of the combustion gases 30 vary substantially between the leading and trailing edges of each vane. Accordingly, the forward and aft channels 62,64 are relatively small in axial or chordal extent compared with the larger middle channel 66. Preferably the middle channel 66 is chordally longer than each of the forward channel 62 and aft channel 64.

However, since the pressure of the inlet air to the vanes is still substantial and the sidewalls of the vanes are relatively thin, each vane preferably also includes a radial middle bridge or septum 74 which splits the middle channel into two radial legs extending in span between the outer and inner bands. The middle bridge 74 integrally joins together the opposite pressure and suction sides of the vane for withstanding the large internal pressure forces thereagainst and reducing undesirable distortion thereof and stress during operation.

In the preferred embodiment illustrated in FIG. 4, the middle bridge 74 is integrally joined to the outer band 40 in a common casting, and terminates short or radially above the inner band 42. Correspondingly, the outer band 40 includes two middle inlets 70 which correspond with the two middle legs of the middle channel. And, the inner band 42 includes a single or common middle outlet 72 at the middle channel below the two legs thereof. The middle channel therefore acts as one channel with two inlets in the outer band, and a common outlet in the inner band.

In the preferred embodiment illustrated in FIG. 4, the forward and middle outlets 72 in the inner band 42 are sized to limit or meter flow of the air from the corresponding forward and middle channels 62,66. Correspondingly, the forward and middle inlets 70 in the outer band are relatively large for reducing pressure losses of the air channeled therethrough.

In contrast, the aft inlet 70 in the outer band is sized to meter or regulate the flow of air into the aft channel 64, whereas the aft outlet 72 in the inner band 42 is relatively large for reducing pressure losses therethrough.

Accordingly, the multichannel nozzle vane 38 illustrated in FIG. 4 permits the use of a single-pressure air source for cooling the different regions of the vane differently, and with corresponding backflow margins notwithstanding the changing distribution of pressure and temperature of the combustion gases flowing past the vanes during operation.

For example, the pressure of the combustion gases 30 at the trailing edge of the vanes is designated P1 in FIG. 4, with the pressure of the air discharged into the aft recess 52 being designated P2. The pressure of the cooling air being discharged into the inner plenum 48 is designated P3. And, the pressure of the inlet air provided to the outer plenum 44 is designated P4, and is selected from a suitable stage of the high pressure compressor, such as the eleventh stage thereof.

The multiple channel configuration of the nozzle vanes 38 illustrated in FIG. 4 permits the common pressure inlet air to be driven through each vane for discharge from the corresponding rows of trailing edge outlets 68 and the several outlets 72 in the inner band 42.

In particular, the aft outlets 72 for the aft channels 64 of the several vanes are disposed through the common inner band 42 in flow communication with the common aft recess 52 for discharging the pressurized air therein at a pressure P2 which is suitably less than the pressure P3 of the air being discharged into the inner plenum 48 from the forward and middle channels 62,66. The discharge pressure P2 is suitably greater than the combustion gas pressure P1 at the vane trailing edge, the discharge pressure P3 is suitably greater than the discharge pressure P2, and the source pressure P4 is in turn greater than the discharge pressure P3.

Since the pressure and suction sides of each vane are preferably imperforate for both the forward and middle channels 62,66, the high pressure inlet air flows therethrough with relatively little pressure drop for providing a relatively high pressure P3 in the inner plenum 48 which may then be used as shown in FIG. 2 for purging and cooling corresponding forward cavities between the last stage of the HPT and the forward side of the first stage IPT nozzle, also known as the HPT disk aft cavity. The P3 air is then channeled through a rotor seal to purge the IPT nozzle aft cavity.

Correspondingly, the air flowing through the aft channel 64 loses pressure as it is discharged in part through the several trailing edge outlets 68 and reaches a relatively low pressure P2 in the aft recess 52. The pressure losses in the aft channel permit a suitable backflow margin along the row of trailing edge outlets for reducing undesirable blowoff therefrom, while the discharge air in the aft recess 52 retains sufficient pressure for cooling and purging the various upper cavities forward of the first stage IPT nozzle as shown in FIGS. 2 and 4.

As shown in FIGS. 4 and 5, the forward and middle channels 62,66 preferably include conventional turbulators 76 extending axially along the internal surfaces of the pressure and suction sides. The turbulators increase heat transfer and the cooling effect of the pressurized air in these channels.

Correspondingly, the aft channel 64 is preferably smooth and devoid of turbulators which are not required for cooling the trailing edge region of the vane, and permit retention of suitable pressure in the air in the aft recess 52 for downstream purging and cooling therefrom.

As initially shown in FIG. 3, each nozzle segment includes a plurality of the vanes 38 extended between the respective outer and inner band segments 40,42 joined in flow communication with the common outer and inner plenums 44,48. Each plenum includes a single aperture defining the respective inlet 46 and outlet 50. And, a tubular outer spoolie 78 is disposed in the plenum inlet as illustrated in FIG. 2, and a corresponding inner spoolie 80 is disposed in the outlet 50 of the inner plenum 48.

In this configuration, the two spoolies 78,80 provide floating flow connections between the IPT nozzle 32 and the outer casing surrounding the nozzle and the inner baffles inside the nozzle in an otherwise conventional manner. Inlet flow of the pressurized air 28 may therefore be efficiently channeled to the common inlet in the multiple vane nozzle segment, and the air may be discharged from the multiple vanes in each segment through the common outlet 50 and inner spoolie to the adjoining components.

The multiple channels of the nozzle vanes 38 permit flow splitting therein from the common source inlet air, with different outlet pressures for matching the different requirements of the adjacent turbine components below the inner band of the nozzle. Effective and preferential cooling of the different regions of each nozzle vane 32 is effected by the multiple channels therein, with substantially imperforate pressure and suction sidewalls except for the single row of trailing edge outlets 68. Suitable backflow margin is maintained over the nozzle vanes including at the trailing edge outlets 68. And, the spent cooling air is discharged from the nozzle vanes through the inner band 42 at correspondingly different pressures which match the requirements for purging and cooling the various forward and aft cavities located below the inner band.

A particular advantage of the first stage IPT turbine nozzle 32 illustrated in FIG. 2 is its preferential use in combination with the high pressure turbine 22 and low pressure turbine 26 illustrated in FIG. 1. The HPT 22 is disposed upstream of the first stage nozzle 32 in the IPT 24, and the LPT 26 is disposed downstream therefrom.

As indicated above, the nozzles in the HPT 22 may have any conventional configuration for providing cooling thereof, including the use of internal impingement baffles and high pressure compressor discharge air.

In contrast, the IPT first stage nozzle 32 is relatively simpler and less expensive and uses the specifically configured multiple channels thereof with a lower source of pressure air such as the eleventh stage high pressure compressor air, without the need for internal impingement baffles therein. The different cooling requirements over the axial extent of the nozzle vanes 38 are accommodated by the specifically configured multiple channels therein, and suitable backflow margin is maintained by the differential pressure resulting from the multiple channels. The different streams of high and low pressure spent cooling air discharged through the inner band of the nozzle 32 are separately channeled for cooling and purging the cavity regions forward and aft of the IPT nozzle.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine nozzle comprising:
a hollow vane having opposite pressure and suction sides extending in span between opposite outer and inner bands and extending in chord between opposite leading and trailing edges;
said pressure and suction sides being imperforate except for a row of trailing edge outlets extending through said pressure side adjacent said trailing edge;
said outer band having an outer plenum including an inlet for receiving compressed air, and said inner band having an inner plenum including an outlet, and an aft flange spaced from said inner plenum to define an aft recess outside said inner plenum;
said vane further including forward, aft, and middle flow channels extending between said outer and inner bands;
said forward channel being disposed behind said leading edge in flow communication with said outer and inner plenums;
said middle channel being disposed behind said forward channel in flow communication with said outer and inner plenums; and said aft channel being disposed behind said middle channel in front of said trailing edge in flow communication with said outer plenum, said trailing edge outlets, and said aft recess.

2. A nozzle according to claim 1 wherein:
said outer band includes forward, aft, and middle aperture inlets joining said outer plenum in flow communication with said forward, aft, and middle channels, respectively; and
said inner band includes forward, aft, and middle aperture outlets joining in flow communication said forward and middle channels with said inner plenum, and said aft channel with said aft recess outside of said inner plenum.

3. A nozzle according to claim 2 wherein:
said middle channel is chordally longer than said forward channel and said aft channel; and
said vane further includes a middle bridge splitting said middle channel into two legs extending in span between said outer and inner bands, and integrally joining together said pressure and suction sides therealong.

4. A nozzle according to claim 3 wherein:
said middle bridge is joined to said outer band and terminates short of said inner band;
said outer band includes two middle inlets at said two middle legs; and
said inner band includes a common middle outlet at said middle channel below said two legs.

5. A nozzle according to claim 4 wherein said forward, middle, and aft channels are separated by imperforate bridges for confining flow of pressurized air between said outer and inner bands.

6. A nozzle according to claim 5 wherein:
said forward and middle outlets in said inner band are sized to meter flow of said air from said forward and middle channels; and
said aft inlet in said outer band is sized to meter flow of said air into said aft channel.

7. A nozzle according to claim 6 wherein inlet in said outer plenum includes a tubular outer spoolie, and said outlet in said inner plenum includes a tubular inner spoolie.

8. A nozzle according to claim 7 wherein:
said forward and middle channels include turbulators along internal surfaces of said pressure and suction sides; and
said aft channel is devoid of turbulators.

9. A nozzle according to claim 7 further comprising a plurality of said vanes joined at opposite ends to said outer and inner bands, with each of said vanes being disposed in flow communication with said outer and inner plenums.

10. A nozzle according to claim 7 in combination with a high pressure turbine disposed upstream of said nozzle, and a low pressure turbine disposed downstream of said nozzle.

11. A turbine nozzle comprising:
a plurality of hollow vanes joined at opposite ends to radially outer and inner bands;
said outer band having an outer plenum including an inlet for receiving compressed air, and said inner band having an inner plenum including an outlet;
each of said vanes including opposite pressure and suction sides joined together at opposite leading and trailing edges, a forward flow channel extending behind said leading edge, an aft flow channel extending in front of said trailing edge, and a middle flow channel disposed between said forward and aft channels; and said forward, aft, and middle channels being disposed in flow communication with said outer plenum for receiving said air therefrom, said forward and middle channels being disposed in flow communication with said inner plenum for discharging said air thereto, and said aft channel extending through said inner band outside said inner plenum for discharging said air.

12. A nozzle according to claim 11 wherein each of said vanes further comprises a row of trailing edge outlets extending through said vane pressure side adjacent said trailing edge in flow communication with said aft channel.

13. A nozzle according to claim 12 wherein:
said outer band includes forward, aft, and middle aperture inlets joining said outer plenum in flow communication with said forward, aft, and middle channels, respectively; and
said inner band includes forward, aft, and middle aperture outlets joining in flow communication said forward and middle channels with said inner plenum, and said aft channel with said outside of said inner plenum.

14. A nozzle according to claim 13 wherein:
said middle channel is chordally longer than said forward channel and said aft channel; and
each of said vanes further includes a middle bridge splitting said middle channel into two legs extending in span between said outer and inner bands, and integrally joining together said pressure and suction sides therealong.

15. A nozzle according to claim 14 wherein:
said middle bridge is joined to said outer band and terminates short of said inner band;
said outer band includes two middle inlets at said two middle legs; and
said inner band includes a common middle outlet at said middle channel below said two legs.

16. A nozzle according to claim 14 wherein said pressure and suction sides are imperforate along both said forward and middle channels for confining said air between said outer and inner plenums.

17. A nozzle according to claim 14 wherein:
said forward and middle outlets in said inner band are sized to meter flow of said air from said forward and middle channels; and
said aft inlet in said outer band is sized to meter flow of said air into said aft channel.

18. A nozzle according to claim 14 wherein inlet in said outer plenum includes a tubular outer spoolie, and said outlet in said inner plenum includes a tubular inner spoolie.

19. A nozzle according to claim 14 wherein:
said inner band further includes an aft flange spaced from said inner plenum to define an aft recess; and
said aft outlets are disposed through said inner band in flow communication with said aft recess for discharging said air therein at a pressure less than pressure of said air discharged into said inner plenum from said forward and middle channels.

20. A nozzle according to claim 14 wherein:
said forward and middle channels include turbulators along internal surfaces of said pressure and suction sides; and
said aft channel is devoid of turbulators.

21. A nozzle according to claim 14 in combination with a high pressure turbine disposed upstream of said nozzle, and a low pressure turbine disposed downstream of said nozzle.

* * * * *